US 12,461,886 B2

(12) United States Patent
Shen

(10) Patent No.: US 12,461,886 B2
(45) Date of Patent: Nov. 4, 2025

(54) SERIAL COMMUNICATION INTERFACE DEVICE

(71) Applicant: ABLIC Inc., Nagano (JP)

(72) Inventor: Biao Shen, Nagano (JP)

(73) Assignee: ABLIC Inc., Nagano (JP)

( * ) Notice: Subject to any disclaimer, the term of this patent is extended or adjusted under 35 U.S.C. 154(b) by 0 days.

(21) Appl. No.: 18/592,532

(22) Filed: Mar. 1, 2024

(65) Prior Publication Data

US 2024/0345986 A1 Oct. 17, 2024

(30) Foreign Application Priority Data

Apr. 12, 2023 (JP) ................... 2023-065153

(51) Int. Cl.
G06F 13/42 (2006.01)
H04L 7/00 (2006.01)
(52) U.S. Cl.
CPC ........ *G06F 13/4291* (2013.01); *H04L 7/0008* (2013.01)
(58) Field of Classification Search
None
See application file for complete search history.

(56) References Cited

U.S. PATENT DOCUMENTS

2010/0017553 A1* 1/2010 Laurencin ........... G06F 13/4282
710/307
2012/0030388 A1* 2/2012 Bas .................... G06F 13/4295
710/110
2012/0257680 A1* 10/2012 Dickens ........... H04N 21/43632
348/498
2012/0275527 A1 11/2012 Douglass
2014/0310436 A1* 10/2014 Du ...................... G06F 13/362
710/110
2017/0103027 A1 4/2017 Olmstead

FOREIGN PATENT DOCUMENTS

CN 104539867 4/2015

OTHER PUBLICATIONS

Philips Semiconductors, "The I2C-bus specification", Product Specification, Jan. 2000, pp. 1-46.
"Search Report of Europe Counterpart Application", issued on Aug. 26, 2024, p. 1-p. 11.

* cited by examiner

Primary Examiner — Farley Abad
Assistant Examiner — Dayton Lewis-Taylor
(74) Attorney, Agent, or Firm — JCIPRNET

(57) ABSTRACT

A serial communication interface device includes a converter, a transmitter, and a receiver. The converter generates a first signal and a second signal based on changes in a clock signal, and a third signal and a fourth signal based on changes in a data signal, converts into the clock signal and the data signal based on the first to the fourth signals, sets the transmission start signal in response to receiving the fourth signal during a period where the clock signal is a first level, and sets the transmission end signal in response to reception of the third signal after reception of the first signal. The transmitter converts the first to the fourth signals into a communication signal and transmits the communication signal to a communication line. The receiver converts the communication signal received from the communication line into the first to the fourth signals.

7 Claims, 5 Drawing Sheets

SERIAL COMMUNICATION INTERFACE DEVICE

CROSS-REFERENCE TO RELATED APPLICATION

This application claims the priority benefit of Japan application serial no. 2023-065153, filed on Apr. 12, 2023. The entirety of the above-mentioned patent application is hereby incorporated by reference herein and made a part of this specification.

BACKGROUND

Technical Field

The present invention relates to a serial communication interface device.

Related Art

The following technique has been disclosed in relation to an interface device of serial communication. In the related art, a transmitter-side serial interface device converts a standard SPI signal into a pulse signal, and a receiver-side serial interface device converts the pulse signal into a standard SPI signal. The transmitter-side serial interface device converts a chip select signal into a pulse signal with a large pulse width, and converts a data signal into a pulse signal with a small pulse width. The receiver-side serial interface device converts the pulse signal with a large pulse width into a chip select signal, and converts the pulse signal with a small pulse width into a data signal and a clock signal.

However, to distinguish between a chip select signal and a data signal based on the pulse width of the pulse signal, the above-mentioned serial interface device includes two types of waveform shaping circuits and noise filters corresponding to the pulse widths in transmission and reception, in which there is possibility of false detection in the case where the signal degrades.

SUMMARY

A serial communication interface device according to at least one embodiment of the present invention is a serial communication interface device which transmits and receives a transmission start signal, a data signal, and a transmission end signal via a communication line. The serial communication interface device includes a converter, a transmitter, and a receiver. The converter generates a first signal and a second signal based on changes in a clock signal received at a clock input port, and a third signal and a fourth signal based on changes in a data signal received at a data input port, converts into the clock signal and the data signal based on the first signal to the fourth signal, sets the transmission start signal in response to receiving the fourth signal during a period where the clock signal is a first level, and sets the transmission end signal in response to reception of the third signal after reception of the first signal. The transmitter converts the first signal to the fourth signal into a communication signal and transmits the communication signal to the communication line. The receiver converts the communication signal received from the communication line into the first signal to the fourth signal.

According to the serial communication interface device of the present invention, compared to the related art, it is possible to reduce the possibility of false detection in the case where the signal degrades, even without including two types of waveform shaping circuits and noise filters corresponding to the pulse widths in transmission and reception.

DESCRIPTION OF EMBODIMENTS

Embodiments of the present invention provide a serial communication interface device with which there is lower possibility of false detection than in the related art even if the signal degrades, and it is not required to include two types of waveform shaping circuits and noise filters corresponding to the pulse widths in transmission and reception.

Hereinafter, a serial communication interface device of the present invention will be described with reference to the drawings.

Figure 2:
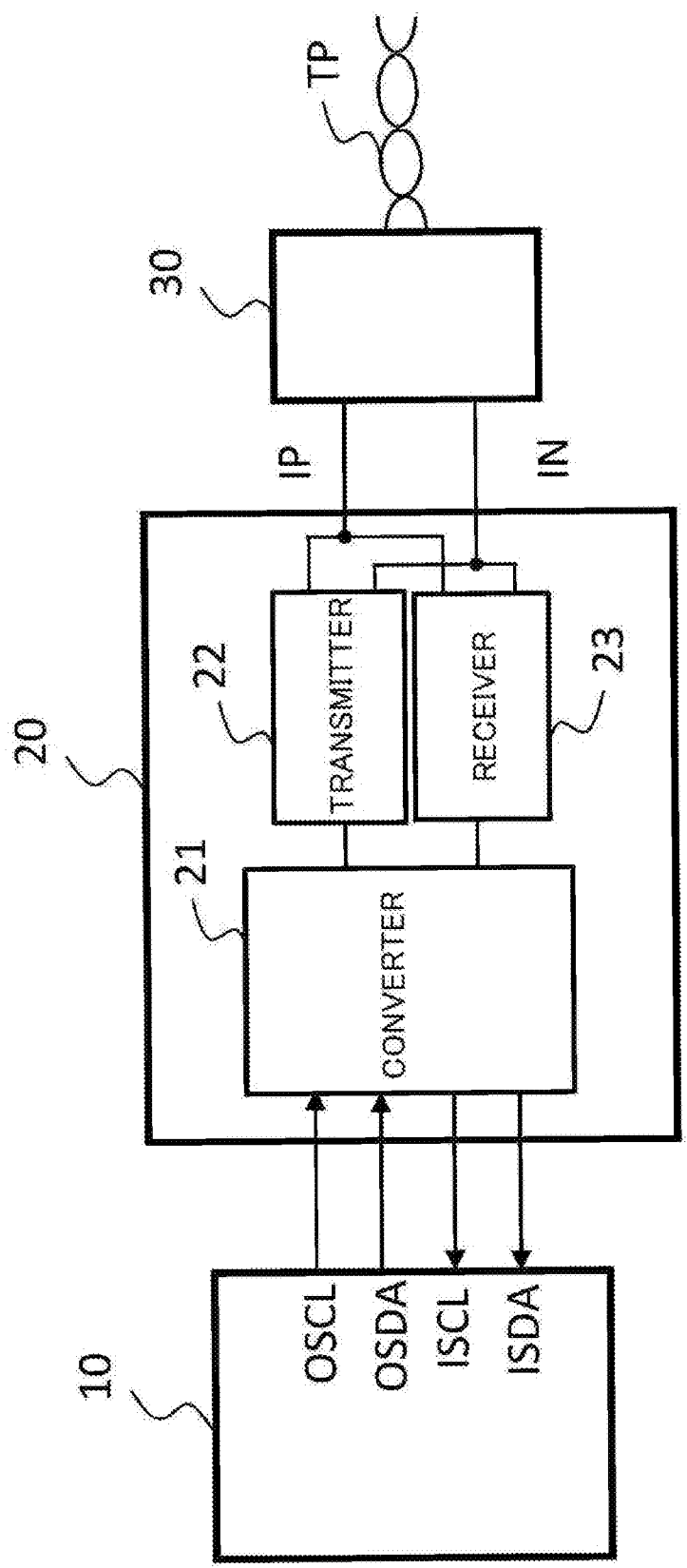
FIG. 2 is a block diagram illustrating an example of the serial communication interface device of this embodiment.

FIG. 2 is a block diagram illustrating an example of a serial communication interface device 20 according to this embodiment.

The serial communication interface device 20 includes a converter 21, a transmitter 22, a receiver 23, two input ports and two output ports connected to a control device 10, and a first communication terminal and a second communication terminal for transmitting and receiving signals of a communication line TP, which is a twisted pair cable, via an insulation part 30.

The converter 21 includes a clock input port and a data input port connected to a clock output port OSCL and a data output port OSDA of the control device 10, a clock output port and a data output port connected to a clock input port ISCL and a data input port ISDA of the control device 10, a signal output port for outputting signals to the transmitter 22, and a signal input port for receiving signals from the receiver 23.

The transmitter 22 includes an input port connected to the signal output port of the converter 21, and an output port for outputting a transmission signal to the insulation part 30. The receiver 23 includes an input port for receiving a reception signal from the insulation part 30, and an output port connected to the signal input port of the converter 21.

Figure 3:
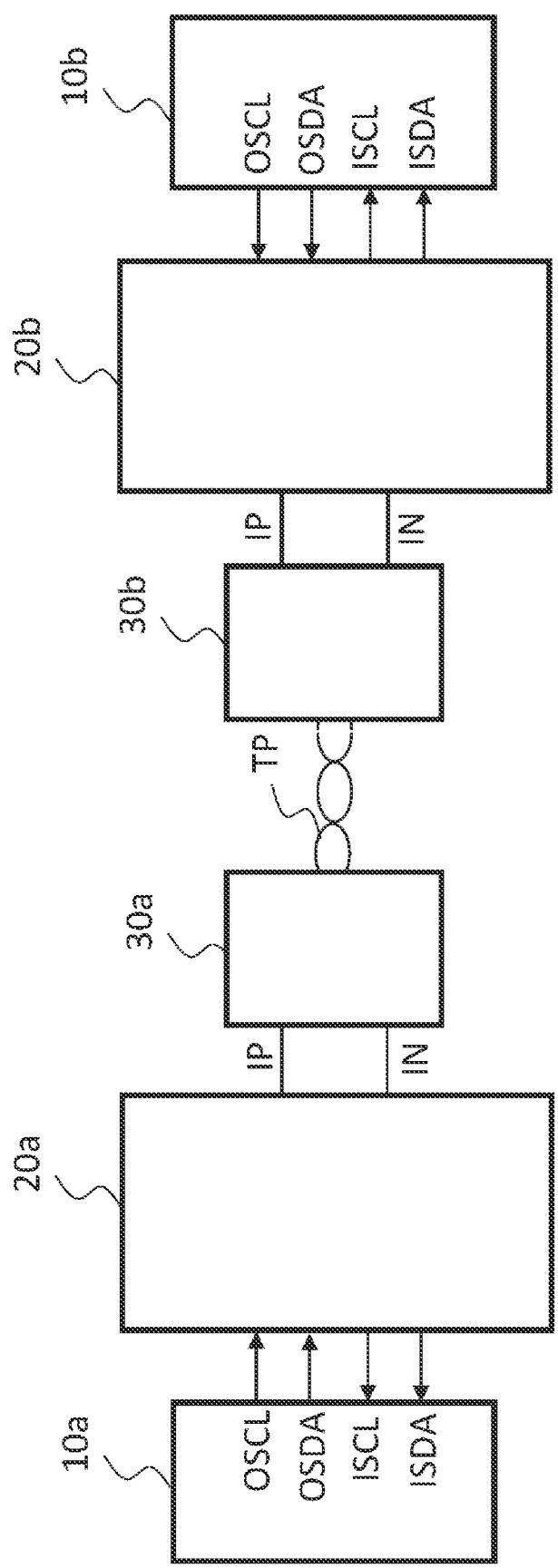
FIG. 3 is a block diagram illustrating an example of a communication system including the serial communication interface device of this embodiment.

FIG. 3 is a block diagram illustrating an example of a communication system including the serial communication interface device 20 of this embodiment. The communication system includes control devices 10a and 10b such as MCUs, serial communication interface devices 20a and 20b, insulation parts 30a and 30b, and a communication line TP.

In the communication system, for example, the control device 10a may serve as a master and the control device 10b may serve as a slave, or the control device 10b may include two converters and two transmitters/receivers to form a daisy chain configuration.

The operation of the serial communication interface device 20 configured as described above will be described with reference to the timing chart in FIG. 1.

First, each signal illustrated in the timing chart will be described. The notation "transmitter side" indicates a content of a signal outputted from the control device 10a to the serial communication interface device 20a. The waveforms of "SCL" and "SDA" on the transmitter side are a clock signal and a data signal received by the converter 21 of the serial communication interface device 20a from the control device 10a.

A "communication signal IP" is a waveform of a signal outputted from a terminal IP serving as a first communication terminal of the serial communication interface device 20a. A signal outputted from a terminal IN serving as a second communication terminal of the serial communication interface device 20a is a waveform obtained by inverting this signal.

The waveforms of "SCL" and "SDA" on the receiver side are a clock signal and a data signal which are converted by the converter 21 of the serial communication interface device 20b based on the signal received from the communication line TP and are outputted to the control device 10b. The notation "receiver side" indicates a content of a signal outputted from the serial communication interface device 20b to the control device 10b.

Figure 1:
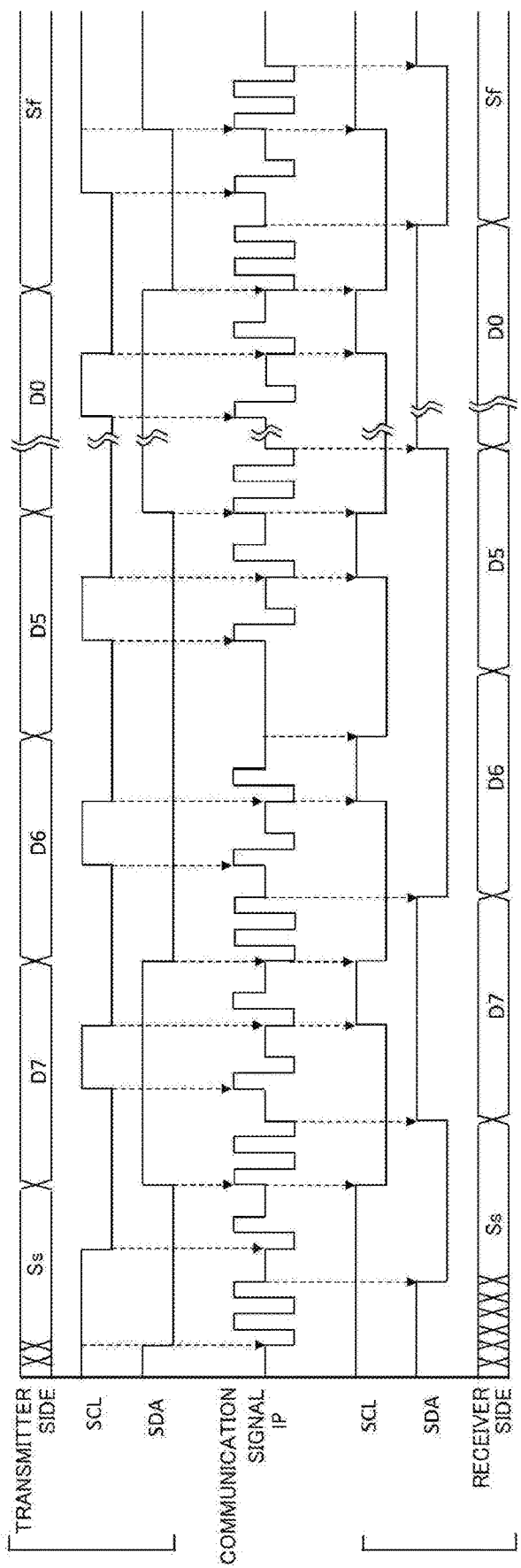
FIG. 1 is a timing chart illustrating an example of an operation of a serial communication interface device of this embodiment.

In the example of the timing chart illustrated in FIG. 1, at timings of rising and falling of the inputted clock signal SCL and the inputted data signal SDA, the converter 21 converts the signals into corresponding signals and outputs the same. Further, between signals, an intermediate level, e.g., a GND level, is temporarily outputted.

The rising signal of the clock signal SCL changes from the intermediate level to the high level, then to the low level, and afterward returns to the intermediate level. The falling signal of the clock signal SCL is the reverse waveform of the rising signal of the clock signal SCL. From the intermediate level, the rising signal of the data signal SDA undergoes two cycles of setting to the high level and then to the low level, and afterward returns to the intermediate level. The falling signal of the data signal SDA is the reverse waveform of the rising signal of the data signal SDA.

In the example of this embodiment, the transmitter side outputs a transmission start signal Ss, 8-bit data signals (D7 to D0), and a transmission stop signal Sf. The transmission start signal Ss is indicated by falling of the data signal SDA during a period (hereinafter, referred to as "high level period") where the clock signal SCL is at the high level and afterward falling of the clock signal SCL. The data signal maintains the high level or the low level for a 1-bit period. The clock signal SCL is a rectangular wave which changes from the high level to the low level in the middle of the 1-bit period.

The waveform and logic of each signal described above are examples and are not limited thereto.

Next, the timing chart in FIG. 1 will be described in detail. The periods of "(transmission start signal) Ss", "D7" to "D0", and "(transmission stop signal) Sf" of the transmitter side described in the timing chart in FIG. 1 and other figures respectively correspond to periods of transmission state of the transmission start signal Ss, the data signal D7, . . . , the data signal D0, and the transmission stop signal Sf of the transmitter side. The periods of "(transmission start signal) Ss", "D7" to "D0", and "(transmission stop signal) Sf" of the receiver side respectively correspond to periods of reception state of the transmission start signal Ss, the data signal D7, . . . , the data signal D0, and the transmission stop signal Sf of the receiver side.

As the transmission start signal Ss, the control device 10a lowers the data signal SDA during the high level period of the clock signal SCL and afterward lowers the clock signal SCL. The serial communication interface device 20a outputs a falling signal of the data signal SDA to the communication line TP, temporarily sets to the intermediate level, and afterward outputs a falling signal of the clock signal SCL.

Upon reception of the falling signal of the data signal SDA from the communication line TP followed by reception of the falling signal of the inputted clock signal SCL, the serial communication interface device 20b lowers the data signal SDA and then lowers the clock signal SCL. Upon reception of falling of the data signal SDA during the high level period of the clock signal SCL followed by falling of the clock signal SCL, the control device 10b understands it as a transmission start signal Ss.

To output as "1" in the data signal D7, the control device 10a raises the data signal SDA and afterward outputs a rectangular wave of the clock signal SCL. The serial communication interface device 20a outputs a rising signal of the data signal SDA to the communication line TP and then outputs a rising signal and a falling signal of the clock signal SCL.

Upon reception of the rising signal of the data signal SDA from the communication line TP, the serial communication interface device 20b raises the data signal SDA, and then upon reception of the rising signal and the falling signal of the clock signal SCL, the serial communication interface device 20b sets the clock signal SCL to the high level and to the low level. The control device 10b reads the data signal SDA at the rise of the clock signal SCL and stores the data signal D7 as "1".

The same processing is performed in the data signals D6 to D0, so repeated descriptions will be omitted. The control device 10a lowers the data signal SDA as a preprocessing for outputting the transmission stop signal Sf. The low level of the data signal SDA is received by the control device 10b via the serial communication interface device 20a, the communication line TP, and the serial communication interface device 20b.

Finally, as the transmission stop signal Sf, the control device 10a sets the clock signal SCL to the high level and afterward raises the data signal SDA. The serial communication interface device 20a outputs a rising signal of the clock signal SCL to the communication line TP, temporarily sets to the intermediate level, and afterward outputs a rising signal of the data signal SDA.

Upon reception of the rising signal of the clock signal SCL from the communication line TP, the serial communication interface device 20b raises the clock signal SCL, and upon reception of the rising signal of the data signal SDA, the serial communication interface device 20b raises the data signal SDA. Upon reception of rising of the data signal SDA during the high level period of the clock signal SCL, the control device 10b understands it as a transmission stop signal Sf.

As described above, the serial communication interface device 20 of this embodiment is configured to output, as the transmission start signal Ss, a falling signal of the data signal SDA followed by a falling signal of the clock signal SCL, and output, as a transmission stop signal Sf, a rising signal of the clock signal SCL followed by a rising signal of the data signal SDA. Thus, even if the signal degrades, there is low possibility of false detection, and it is not required to include two types of waveform shaping circuits and noise filters corresponding to the pulse widths in transmission and reception.

Figure 4:
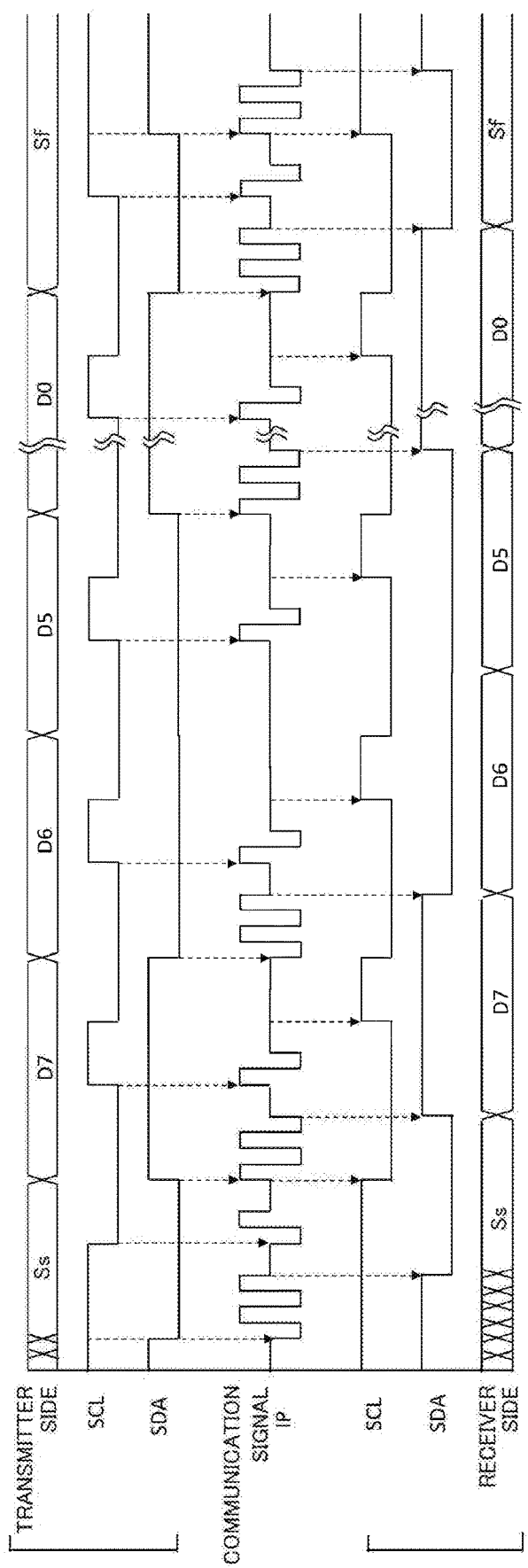
FIG. 4 is a timing chart illustrating another example of the operation of the serial communication interface device of this embodiment.

FIG. 4 is a timing chart illustrating another example of the operation of the serial communication interface device 20 of this embodiment. Since the basic operation of the serial communication interface device 20 and each signal are similar to those in the timing chart in FIG. 1, detailed description thereof will be omitted.

In the operation of the serial communication interface device 20 illustrated in FIG. 4, the converter 21 converts and outputs corresponding signals at timings of rising of the inputted clock signal SCL and rising and falling of the inputted data signal SDA. That is, the signal at the timing of falling of the clock signal SCL during data transmission is omitted from the timing chart in FIG. 1.

Thus, the serial communication interface device 20b sets the clock signal SCL to the high level upon reception of a rising signal of the clock signal SCL, and afterward sets, by itself, to the low level after lapse of a predetermined time.

Herein, upon reception of the rising signal of the clock signal SCL from the communication line TP followed by the rising signal of the data signal SDA as a transmission stop signal Sf, the serial communication interface device 20b raises the clock signal SCL without lowering it afterward, and raises the data signal SDA.

The serial communication interface device 20 illustrated in FIG. 4 is similarly configured to output, as the transmission start signal Ss, a falling signal of the data signal SDA followed by a falling signal of the clock signal SCL, and output, as the transmission stop signal Sf, a rising signal of the clock signal SCL followed by a rising signal of the data signal SDA.

As described above, with the serial communication interface device 20, even if the signal degrades, there is low possibility of false detection, and it is not required to include two types of waveform shaping circuits and noise filters corresponding to the pulse widths in transmission and reception. Furthermore, since the signal at the timing of falling of the clock signal SCL is not transmitted, it is more advantageous for speeding up compared to the case in FIG. 1.

Figure 5:
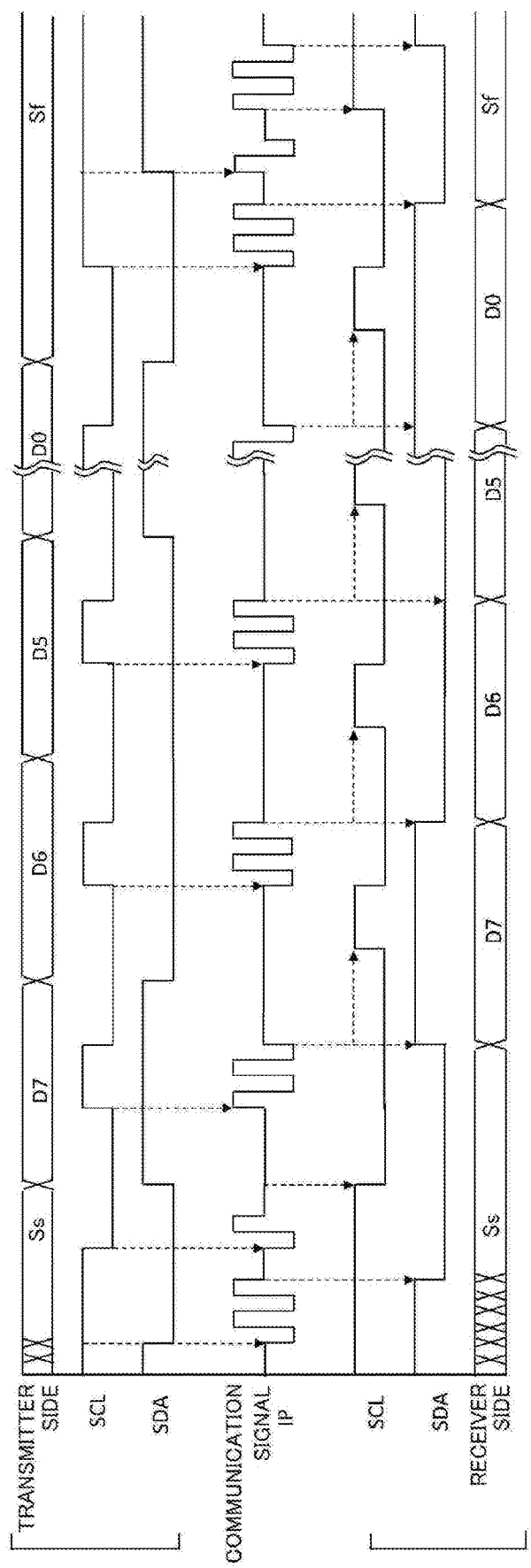
FIG. 5 is a timing chart illustrating another example of the operation of the serial communication interface device of this embodiment.

FIG. 5 is a timing chart illustrating another example of the operation of the serial communication interface device 20 of this embodiment.

The serial communication interface device 20a illustrated in FIG. 5 is different from the above example, and the converter 21 converts the data signal SDA into a signal corresponding to the data and outputs the signal at a timing of rising of the inputted clock signal SCL. That is, the signal of falling of the clock signal SCL and the signals of rising and falling of the data signal SDA are omitted from the timing chart in FIG. 1, and only a signal corresponding to the data of the data signal SDA is outputted at the timing of rising of the clock signal SCL. Herein, the signal outputted at the timing of rising of the clock signal SCL is equal to the falling signal of the data signal SDA when the data is 0, and is equal to the rising signal of the data signal SDA when the data is 1.

Thus, the serial communication interface device 20b changes the level of the data signal SDA upon reception of the signal corresponding to the data of the data signal SDA, and, after lapse of a predetermined time, sets the clock signal SCL by itself to the high level and afterward to the low level.

The serial communication interface device 20a illustrated in FIG. 5 is similarly configured to output, as the transmission start signal Ss, a falling signal of the data signal SDA followed by a falling signal of the clock signal SCL, and output, as the transmission stop signal Sf, a rising signal of the clock signal SCL followed by a rising signal of the data signal SDA.

Herein, before the transmission stop signal Sf and after falling of the data signal SDA, the serial communication interface device 20a outputs a signal of the data 0 because the clock signal SCL rises. However, the serial communication interface device 20a understands it as a transmission stop signal Sf because the clock signal SCL does not fall and the data signal SDA rises. Thus, in response to rising the data signal SDA, the serial communication interface device 20a outputs, as the transmission stop signal Sf, a rising signal of the clock signal SCL and a following rising signal of the data signal SDA.

The serial communication interface device 20b receives a signal of the data 0 as the 9th-bit data from the communication line TP, and immediately afterward, receives, as the transmission stop signal Sf, a rising signal of the clock signal SCL and a following rising signal of the data signal SDA. Thus, the serial communication interface device 20b raises the clock signal SCL upon reception of the rising signal of the clock signal SCL, and raises the data signal SDA upon reception of the rising signal of the data signal SDA.

As described above, with the serial communication interface device 20, even if the signal degrades, there is low possibility of false detection, and it is not required to include two types of waveform shaping circuits and noise filters corresponding to the pulse widths in transmission and reception. Furthermore, since only the signal corresponding to the data of the data signal SDA is outputted at the timing of rising of the clock signal SCL, it is more advantageous for speeding up compared to the case in FIG. 4.

As described above, the serial communication interface device 20 according to this embodiment is configured to output, as the transmission start signal Ss, a falling signal of the data signal SDA followed by a falling signal of the clock signal SCL, and output, as the transmission stop signal Sf, a rising signal of the clock signal SCL followed by a rising signal of the data signal SDA. Thus, it is possible to provide a serial communication interface device with little false detection in the case of signal degradation even without including two types of waveform shaping circuits and noise filters corresponding to the pulse widths in transmission and reception.

Although the embodiments of the present invention have been described above, the present invention is not limited to these embodiments, and various changes may be made within the scope without departing from the spirit of the present invention. For example, the waveform of the communication signal IP may also be a sine wave. Further, the control device 10b may understand it as a transmission start signal Ss upon reception of falling of the data signal SDA during the high level period of the clock signal SCL.

What is claimed is:

1. A serial communication interface device which transmits and receives a transmission start signal, a data signal, and a transmission end signal via a communication line, the serial communication interface device comprising:
   a converter including a clock input port and a data input port, a clock output port and a data output port, a signal output port, and a signal input port;
   a transmitter including an input port connected to the signal output port of the converter and an output port, and is configured to convert a first to a fourth signals received from the converter into a communication signal and transmit the communication signal to the communication line; and a receiver including an input port for receiving the communication signal received from the communication line and an output port connected to the signal input port of the converter, and is configured to convert the communication signal into the first to the fourth signals and transmit the first to the fourth signals to the converter, wherein in a first state where the serial communication interface device is a transmitter side, the converter is configured to generate the first signal corresponding to rising of the clock signal received from the clock input port, the second signal corresponding to falling of the clock signal received from the clock input port, the third signal corresponding to rising of the data signal received from the data input port, and the fourth signal corresponding to falling of the data signal received from the data input port, set the transmission start signal in response to generating the fourth signal during a period where the clock signal is a first level, set the transmission end signal in response to generating of the third signal after generation of the first signal, and transmit the first to the fourth signals to the transmitter, wherein in a second state where the serial communication interface device is a receiver side, the converter is configured to convert the first and the second signals received from the receiver into the clock signal based upon the first signal corresponding to rising of the clock signal and the second signal corresponding to falling of the clock signal, convert the third and the fourth signals received from the receiver into the data signal based upon the third signal corresponding to rising of the data signal and the fourth signal corresponding to falling of the data signal, transmit the converted clock signal to the clock output port and the converted data signal to the data output port, set the transmission start signal in response to receiving the fourth signal during a period where the clock signal is a first level, and set the transmission end signal in response to reception of the third signal after reception of the first signal.

2. The serial communication interface device according to claim 1, wherein
the converter is configured to set the transmission start signal in response to receiving the second signal after reception of the fourth signal during a period where the clock signal is the first level.

3. The serial communication interface device according to claim 1, wherein
the converter is configured to set the data signal in response to receiving the first signal after reception of the second signal.

4. The serial communication interface device according to claim 1, wherein
the converter is configured to set the data signal in response to receiving the first signal after reception of the third signal.

5. The serial communication interface device according to claim 1, wherein
the converter is configured to set the data signal in response to receiving the first signal after reception of the fourth signal.

6. The serial communication interface device according to claim 1, wherein
the converter is configured to set the data signal in response to reception of the first signal and afterward reception of the first signal at a 1-bit data length interval.

7. The serial communication interface device according to claim 1, wherein
the converter is configured to set the data signal as a first data upon reception of the third signal, and sets the data signal as a second data upon reception of the fourth signal.

* * * * *